US011468880B2

(12) United States Patent
Lin et al.

(10) Patent No.: US 11,468,880 B2
(45) Date of Patent: Oct. 11, 2022

(54) DIALOG SYSTEM TRAINING USING A SIMULATED USER SYSTEM

(71) Applicant: Adobe Inc., San Jose, CA (US)

(72) Inventors: Tzu-Hsiang Lin, Pittsburgh, PA (US);
Trung Huu Bui, San Jose, CA (US);
Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 995 days.

(21) Appl. No.: 16/198,302

(22) Filed: Nov. 21, 2018

(65) Prior Publication Data

US 2020/0160842 A1    May 21, 2020

(51) Int. Cl.
*G06N 20/00*    (2019.01)
*G10L 15/06*    (2013.01)
*G06N 5/04*    (2006.01)

(52) U.S. Cl.
CPC ............ *G10L 15/063* (2013.01); *G06N 5/045* (2013.01); *G06N 20/00* (2019.01); *G10L 2015/0638* (2013.01)

(58) Field of Classification Search
None
See application file for complete search history.

(56) References Cited

U.S. PATENT DOCUMENTS

| 2018/0329998 | A1* | 11/2018 | Thomson | ......... | H04N 21/41407 |
| 2019/0095738 | A1* | 3/2019 | Sharma | ................. | G06V 30/194 |
| 2020/0134103 | A1* | 4/2020 | Mankovskii | ............ | G06F 40/56 |

OTHER PUBLICATIONS

Bychkovsky, "Learning photographic global tonal adjustment with a database of input/output image pairs", Proceedings of the 2011 IEEE Conference on Computer Vision and Pattern Recognition, Jun. 2011, pp. 97-104.
Hou, "Sequence-to-Sequence Data Augmentation for Dialogue Language Understanding", Jul. 4, 2018, 12 pages.
Li, "End-to-End Task-Completion Neural Dialogue Systems", Feb. 11, 2018, 11 pages.
Lin, "Microsoft COCO: Common Objects in Context", Computer Vision and Pattern Recognition, May 1, 2014, 16 pages.
Wen, "A Network-based End-to-End Trainable Task-oriented Dialogue System", Apr. 24, 2017, 12 pages.

* cited by examiner

*Primary Examiner* — David R Vincent
(74) *Attorney, Agent, or Firm* — FIG. 1 Patents

(57) ABSTRACT

Dialog system training techniques using a simulated user system are described. In one example, a simulated user system supports multiple agents. The dialog system, for instance, may be configured for use with an application (e.g., digital image editing application). The simulated user system may therefore simulate user actions involving both the application and the dialog system which may be used to train the dialog system. Additionally, the simulated user system is not limited to simulation of user interactions by a single input mode (e.g., natural language inputs), but also supports multimodal inputs. Further, the simulated user system may also support use of multiple goals within a single dialog session

20 Claims, 7 Drawing Sheets

DIALOG SYSTEM TRAINING USING A SIMULATED USER SYSTEM

BACKGROUND

Digital content editing applications support a wide range of functionality to create and edit digital content, such as digital images, digital audio, digital video, and so forth. Users, for instance, may interact with a multitude of tools accessible via a variety of user interfaces to draw, apply filters, alter pixels, hole filling, and so forth to create and edit digital images. Additionally, this user interaction may be supported in a variety of different modes, such as through a cursor control device and/or gestures implemented via touchscreen functionality. Further, this user interaction may involve multiple goals in execution of the application, e.g., to adjust contrast by a defined amount. As a result, conventional user interaction with digital content editing applications may involve specialized knowledge to learn about, locate, and apply desired tools in order to create digital content. Even with such specialized knowledge, the multitude of tools that are accessible via these variety of interfaces may involve significant amounts of navigation through the user interface to locate a tool of interest, which is inefficient with respect to the user as well as computing devices that support this prolonged navigation to achieve a desired operation.

One technique that has been utilized to assist user interaction with computing devices and applications is referred to as a dialog system. Dialog systems support a dialog (e.g., back-and-forth communication using natural language) between a user and the computing device to initiate system actions. To do so, dialog systems are trained to determine a likely goal (i.e., intent) of a user input as specified via a natural language input.

Conventional techniques used to train dialog systems, however, result in inaccuracies and inefficient use of computational resources. This is because conventional training techniques employed for dialog systems are single modal (e.g., accept a single type of input), are configured for use with a single agent (e.g., the dialog system), and involve a single goal, e.g., execution of a single operation of a computing device. Because of these limitations, conventional training techniques for dialog systems are ill suited for addressing applications that support multiple modes (e.g., types of inputs), multiple agents (e.g., are limited to the dialog system itself), and/or multiple goals (e.g., multiple operations to be executed by the application).

Continuing with the digital content editing application example above, for instance, conventional dialog systems are not able to support multiple agents (e.g., interaction with both the application and the dialog system), multiple modes for interacting with the application (e.g., gesture, cursor control devices, and spoken utterances), nor multiple goals involving execution of multiple operations by the computing device, e.g., multiple related operations. Accordingly, conventional dialog systems are not capable of supporting user interaction involving multiple agents, modes, and goals with these digital content editing applications. Because of this, users are still forced to engage in sometimes tedious navigation through a user interface to initiate desired interactions and operations of these digital content editing applications, which is inefficient to both the user and computing device that implement these techniques.

SUMMARY

Dialog system training techniques that employ a simulated user system are described. The simulated user system overcomes the challenges of conventional training techniques through support of multiple agents (e.g., interaction with the dialog system and an application), multiple modes (e.g., spoken utterances to the dialog system and other types of inputs to the application, jointly), and multiple goals, thereby increasing accuracy and efficiency of computational resource consumption and user interaction.

In one example, a simulated user system supports interaction with multiple agents. Thus, the dialog system training techniques described herein are not limited to interaction between a simulated user system and a dialog system but may also address additional agents as part of training the dialog system. The dialog system, for instance, may be configured for use with an application (e.g., digital image editing application) along with the dialog system. The simulated user system may therefore simulate user actions involving both the application and the dialog system which may be used to train the dialog system.

Additionally, the simulated user system supports multimodal inputs and thus is not limited to simulation of user interactions by a single input mode (e.g., natural language inputs) as in conventional techniques. As such, other user actions may be simulated (e.g., interaction with a user interface of the application via gestures, "clicks" using a cursor control device, and so on) that is not possible using conventional techniques. In this way, the simulated user system supports increased richness in training of the dialog system and thus supports increased accuracy and computational efficiency in the operation of computing devices that implement the system.

Further, the simulated user system supports use of multiple goals within a single dialog session, and thus is not limited to a single goal/output analysis of conventional techniques. The simulated user system, for instance, may employ an agenda stack having a plurality of goals, e.g., open, adjust, close, undo, and redo. Rewards may then be defined with respect to the agenda stack, both singly with respect to individual goals and collectively with respect to the agenda stack as a whole. The rewards are then used as a basis to train the dialog system. As a result, the simulated user system supports increased richness and sophistication in training of the dialog system to support individual as well as collective goals. Further discussion of these and other examples is included in the Detail Description below.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
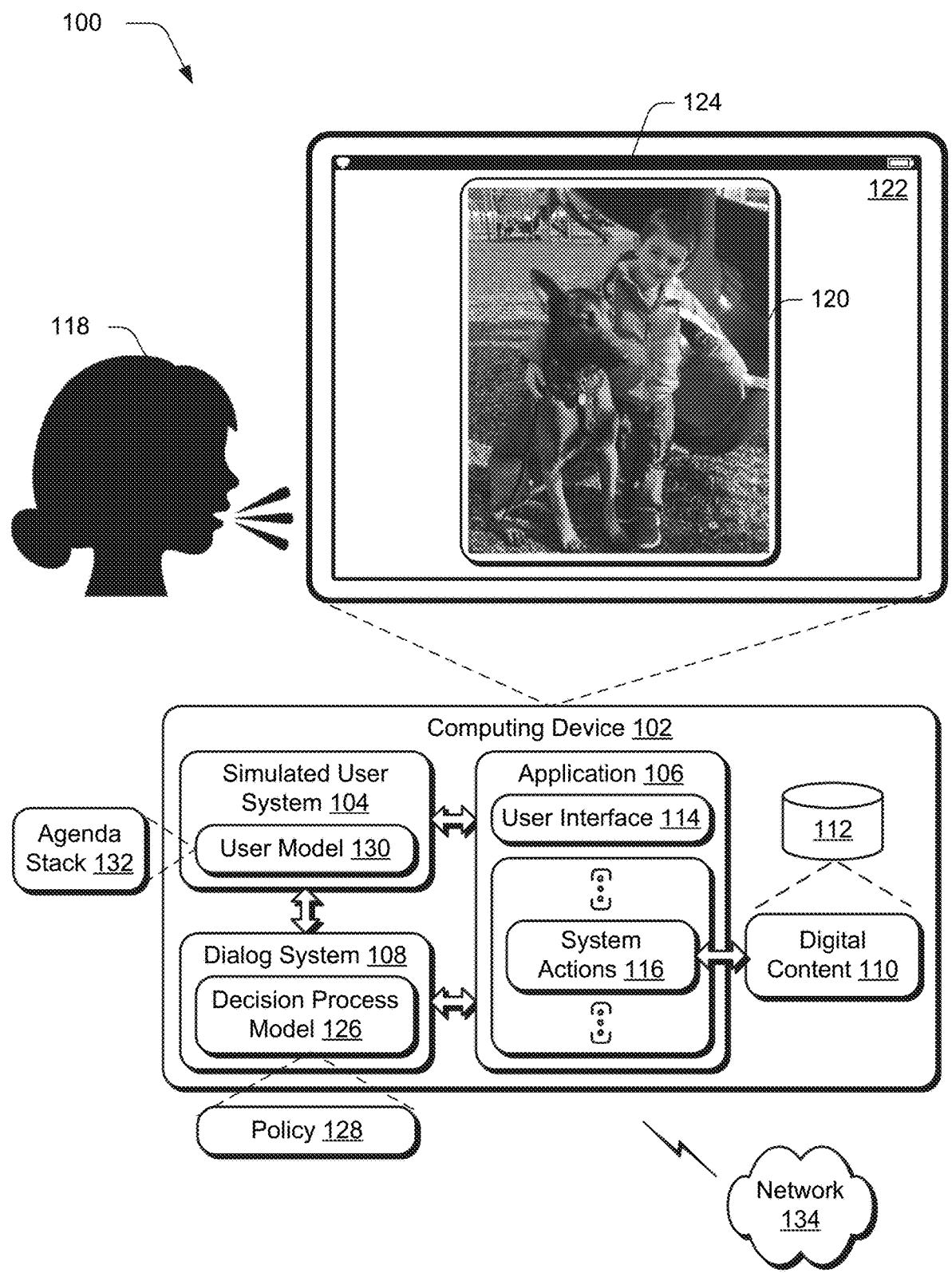
FIG. 1 is an illustration of an environment in an example implementation that is operable to employ dialog system training techniques using a simulated user system described herein.

Dialog system training techniques using a simulated user system are described. The simulated user system overcomes a variety of challenges of conventional training techniques. These techniques, for instance, support multimodal, multiagent, and multigoal simulation of user actions through training of a policy of a dialog system using individual rewards based on a respective dialog and cumulative awards based on a dialog session as a whole. As such, the techniques described herein support increased richness in simulating user actions with a wider range of modes, goals, and agents that is not possible using conventional techniques that are single modal, support a single agent (e.g., the dialog system, itself), and a single goal.

To do so, the simulated user system is configured to employ an agenda based approach which involves first generating an agenda stack. The agenda stack is an ordered sequence of a plurality of goals within a single dialog session. The agenda stack may also support multiple goals in parallel and thus is not limited to a single sequence. In order to generate the agenda stack, a goal generation module of the simulated user system is used to select from a plurality of predefined goals (e.g., open, adjust, close, undo, and redo) and also set values for respective goals (e.g., "slots"), as appropriate. Additional goals may be added during runtime, e.g., to undo or redo simulated user actions based on whether those actions are successfully completed.

Once generated, the simulated user system then simulates user actions that may involve multiagent interaction (e.g., with the dialog system and application), multimodal interaction (e.g., gestures and dialog), and multigoal interaction as part of a dialog session. The simulated user system, for instance, may begin by selecting an open goal, which includes a slot specifying an item of digital content to be processed by an application, e.g., a digital image for an image editing operation. The simulated user system also selects at least one adjust goal to adjust an attribute by a defined value, e.g., an object included in the digital image. The adjust goal, for instance, may specify an object using a mask. This mask is used to generate a basis of a gesture by determining a centroid of the object using the mask that is to be subject of a "click." Other goals may also be specified, including undo and redo as part of a dialog session, which ends with a close goal in the agenda stack.

Each of the goals, for instance, correspond to a respective dialog within a dialog session between the simulated user system and the dialog system, and may also include interaction with the application for support of multiagent interaction as well as multimodal interaction. In the previous example, the gesture and the dialog support multiagent and multimodal interaction (with the application using the gesture and the dialog system using the dialog) and multiple goals (e.g., open and adjust) as part of the dialog session. This is not possible in conventional techniques used to train a dialog system in which interaction is limited to the dialog system (e.g., single agent) using a single mode of interaction (e.g., a dialog) and a single goal.

A policy of the dialog system is trained based on whether a corresponding goal of each these simulated user interactions is achieved, both for the individual interactions themselves as well as the series of user interactions as a whole. For example, the simulated user system may cause the dialog system to initiate a system action of the application, e.g., to "brighten" an object selected by a gesture. The simulated user system then determines whether the execution of the system action by the application (as initiated by the dialog system) accomplishes a corresponding goal of the simulated user action from the agenda stack.

Based on this determination, the simulated user system generates reward data that is used to train the policy, e.g., whether the goal was or was not met by the executed system action by the application. This includes initiation of the system action directly by the gesture or indirectly by the dialog system in the previous example. As a result, the simulated user system may support different types of rewards through use of the agenda stack that are not possible using conventional techniques. The reward, for instance, may be based both singly with respect to individual goals of the agenda stack and collectively with respect to the agenda stack as a whole. In this way, the simulated user system supports increased richness and sophistication in training of the dialog system to support individual as well as collective goals which is not possible using conventional training techniques.

As a result, the dialog system, once trained using the simulated user system, is capable of addressing a wide range of user inputs and operations of digital content editing applications that is not possible using conventional dialog systems. This improves user efficiency through use of the dialog system in interacting with the digital content editing application as well as computational efficiency of the application through increased efficiency of these inputs in achieving a desired goal as part of creating and editing digital content.

Digital content editing applications, for instance, may include a multitude of tools that are user selectable to edit digital content. In some instances, these tools involve multimodal inputs as well as include multiple goals as part of achieving a desired operation. Conventional dialog systems, however, do not support multiple modes but rather are limited to a single type of input, e.g., text that is either typed or translated from a spoken utterance. Conventional dialog system are also limited to a single goal, e.g., a single operation. Further, conventional dialog systems are limited to support of interaction with a single agent (i.e., the dialog system itself), and as such do not support simultaneous interaction with another application, e.g., with the digital content editing application also.

The dialog system training techniques described herein are able to support multiple agents (e.g., interaction with both the application and the dialog system), multiple modes for interacting with the application (e.g., gesture, cursor control devices, and spoken utterances), and multiple goals involving execution of multiple operations by the application. This increased richness supports use of a dialog system with digital content editing applications that is not possible using conventional dialog systems. In this way, the dialog system may improve efficiency of user interaction with these applications in ways that are not possible using conventional techniques, further discussion of which is included in the following sections.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ dialog system training techniques using a simulated user system described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 7.

The computing device 102 is illustrated as including a simulated user system 104, an application 106, and a dialog system 108. The application 106 may be configured in a variety of ways to support user interaction to create, edit, and render digital content 110, which is illustrated as stored in a storage device 112. The digital content 110, for instance, may be configured as a digital image, digital audio, digital media, documents, spreadsheets, presentations, and other data. The application 106 includes a user interface 114 that supports user actions to initiate system actions 116 of the application 106, e.g., by a user 118. The user actions, for instance, may be specified using a graphical user interface via a gesture, through use of a keyboard, cursor control device, and so forth to create and edit the digital content 110.

The dialog system 108, also known as a conversational agent (CA), is configured to support a dialog (e.g., as a natural language conversation) between the user 118 and the computing device 102 to initiate the system actions 116 of the application 106. The dialog, for instance, may support user inputs (e.g., via spoken utterances or text) and follow-up questions from the dialog system 108 to determine a user's goal in initiating one or more of the system actions 116. In the illustrated example, the dialog may include a user input to "brighten the dog in the digital image." In response, the dialog system 108 is configured to locate a corresponding object (e.g., the dog) in the digital image 120 displayed in the user interface 122 by the display device 124 and a system action 116 to be applied to the object, e.g., "brighten."

In order to determine a goal of a user action, the dialog system 108 employs a decision process model 126 having a policy 128. The policy 128 is used to determine a probability that respective user actions (and amounts specified for those actions) correspond to respective ones of the system actions 116. Thus, accurate training of the decision process model 126 and policy 128 (e.g., reinforcement learning) contributes directly to accuracy of the model and policy in operation in the "real world." As previously described, however, conventional training techniques suffered from a variety of challenges that limit accuracy of these techniques and thus result in inefficient use of computational resources.

In the techniques described herein, however, the simulated user system 104 is configured to address these challenges through use of a user model 130 and agenda stack 132. In an example, the user model 130 supports multiagent simulated user actions with both the application 106 and the dialog system 108. The user model 130, for instance, may generate a simulated user action that includes a gesture (e.g., selection of the dog in the digital image 120) as an input to the application 106 and a dialog as an input to the dialog system 108, e.g., "brighten." As a result, the simulated user system 104 is not limited to single agents, e.g., interaction with the dialog system 108. Also, in this instance the simulated user actions also support multimodal inputs, e.g., the gesture and the dialog, and thus expand beyond conventional single modal techniques that are limited to a dialog, alone.

Further, the user model 130, through use of the agenda stack 132, supports multiple goals within a single dialog session. As a result, the agenda stack 132 may be utilized to describe sophisticated user behaviors that are not possible using conventional training techniques that involve composite-task oriented dialogs.

In order the train the policy 128 of the dialog system 108, the simulated user system 104 generates the agenda stack 132 to include a plurality of goals that are to be accomplished via a single dialog session. The goals, for instance, may include opening an item of digital content 110, adjusting an attribute of the item of digital content 110, and then closing the item of digital content to complete the dialog session. Each of these goals includes a corresponding simulated user action that is generated by the simulated user system 104.

The simulated user system 104, for instance, sequentially generates simulated user actions. The simulated user system then determines whether the execution of the system actions by the application 106 (as initiated by the dialog system 108) accomplishes a corresponding goal of the simulated user action from the agenda stack 132. Based on this determination, the simulated user system 104 generates reward data that is used to train the policy 128, e.g., whether the goal was or was not met by the executed system action by the application 106.

Through use of the agenda stack 132, the simulated user system 104 supports different types of rewards that are not possible using conventional techniques. The reward, for instance, may be based both singly with respect to individual goals of the agenda stack 132 and collectively with respect to the agenda stack 132 as a whole. In this way, the simulated user system 104 supports increased richness and sophistication in training of the dialog system 108 to support individual as well as collective goals, further discussion of which is described in relation to the following sections and shown in corresponding figures. Although illustrated as implemented locally at the computing device 102, functionality of the simulated user system 104, application 106, and/or dialog system 108 may also be implemented as whole or part via functionality available via the network 134, such as part of a web service or "in the cloud."

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Dialog System Training Using a Simulated User System

Figure 2:
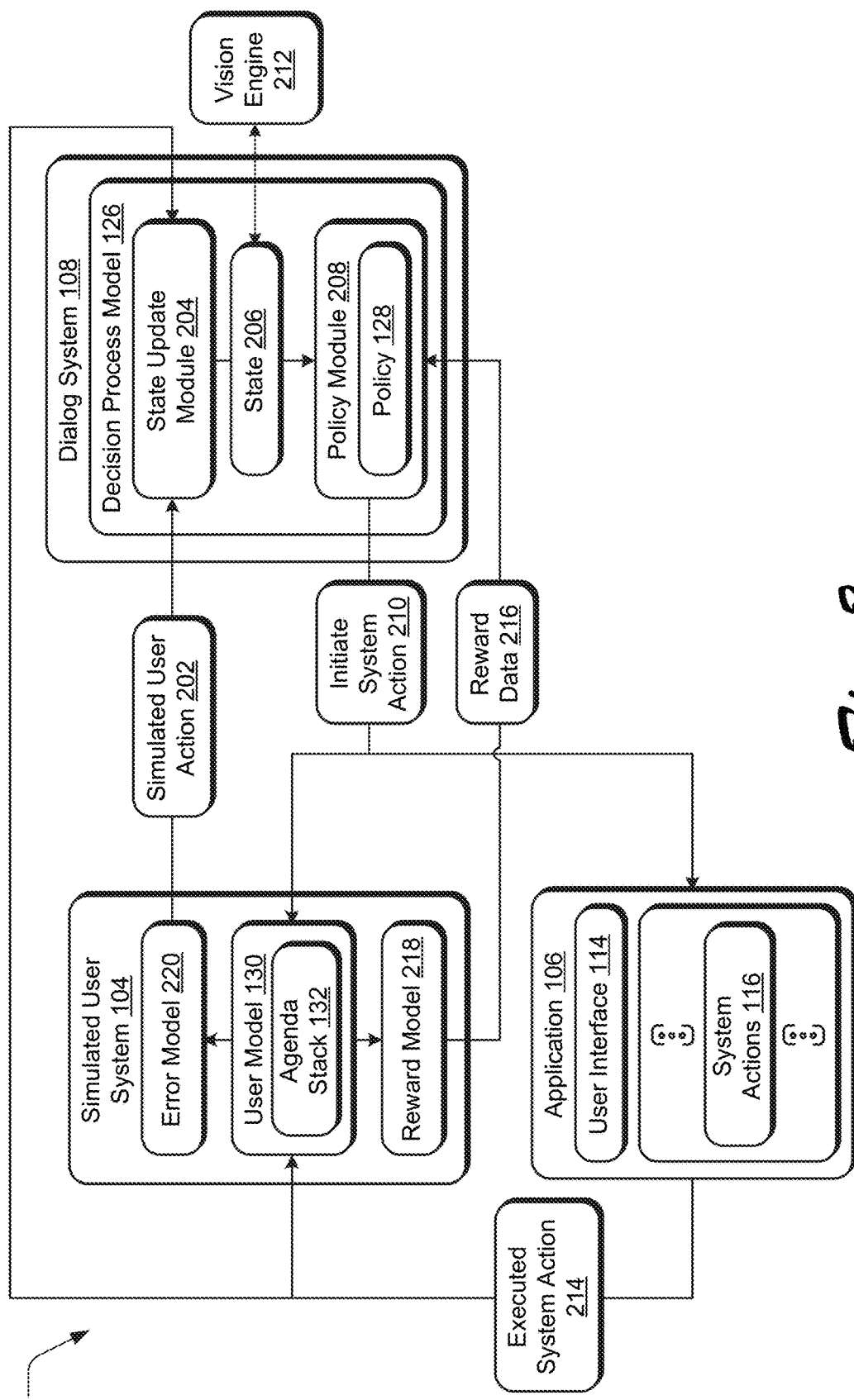
FIG. 2 depicts a system in an example implementation showing training of a dialog system of FIG. 1 using an application by the simulated user system in greater detail.
Figure 3:
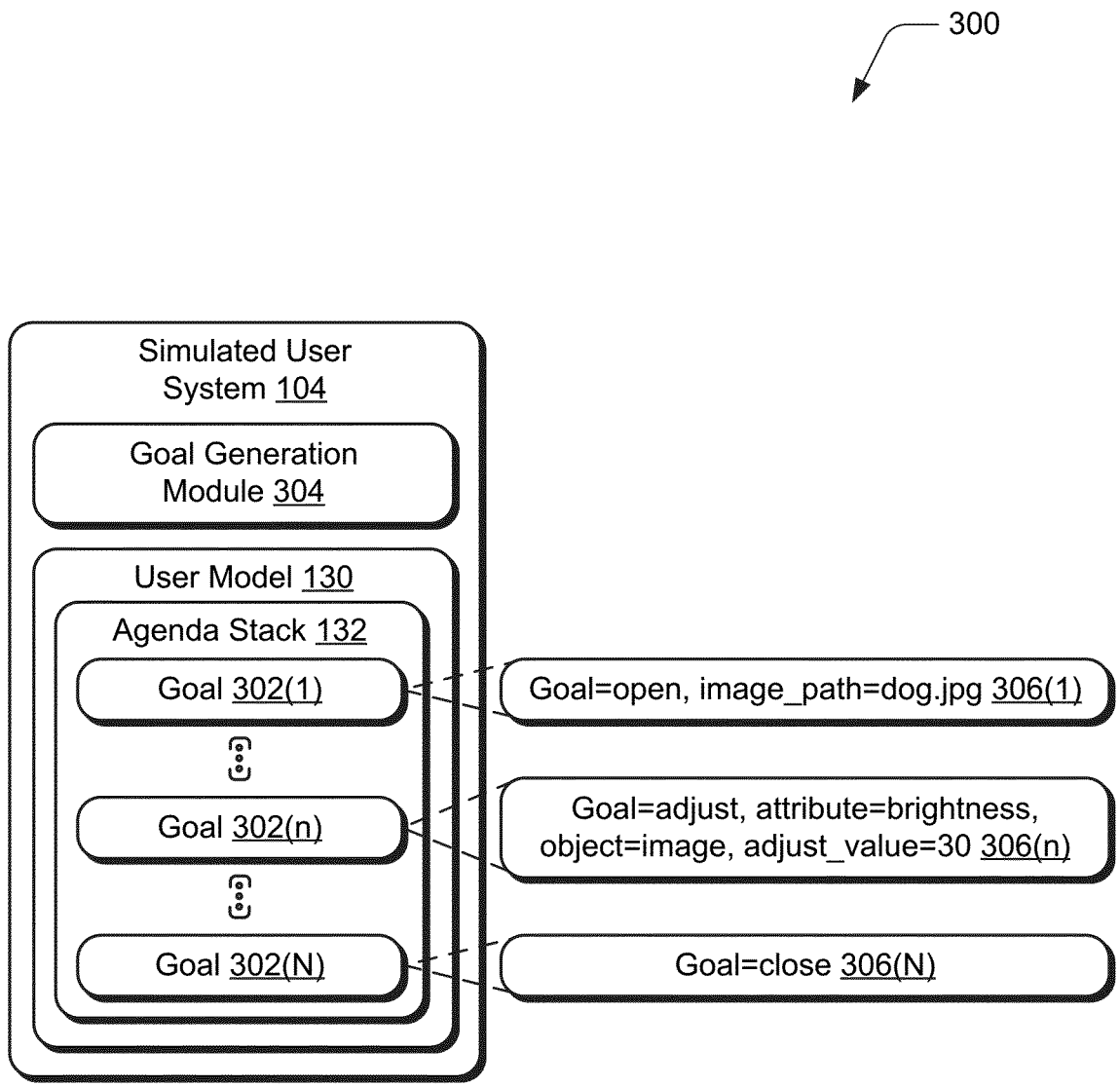
FIG. 3 depicts an example implementation of a user model of FIG. 2 in greater detail as generating an agenda stack.
Figure 4:
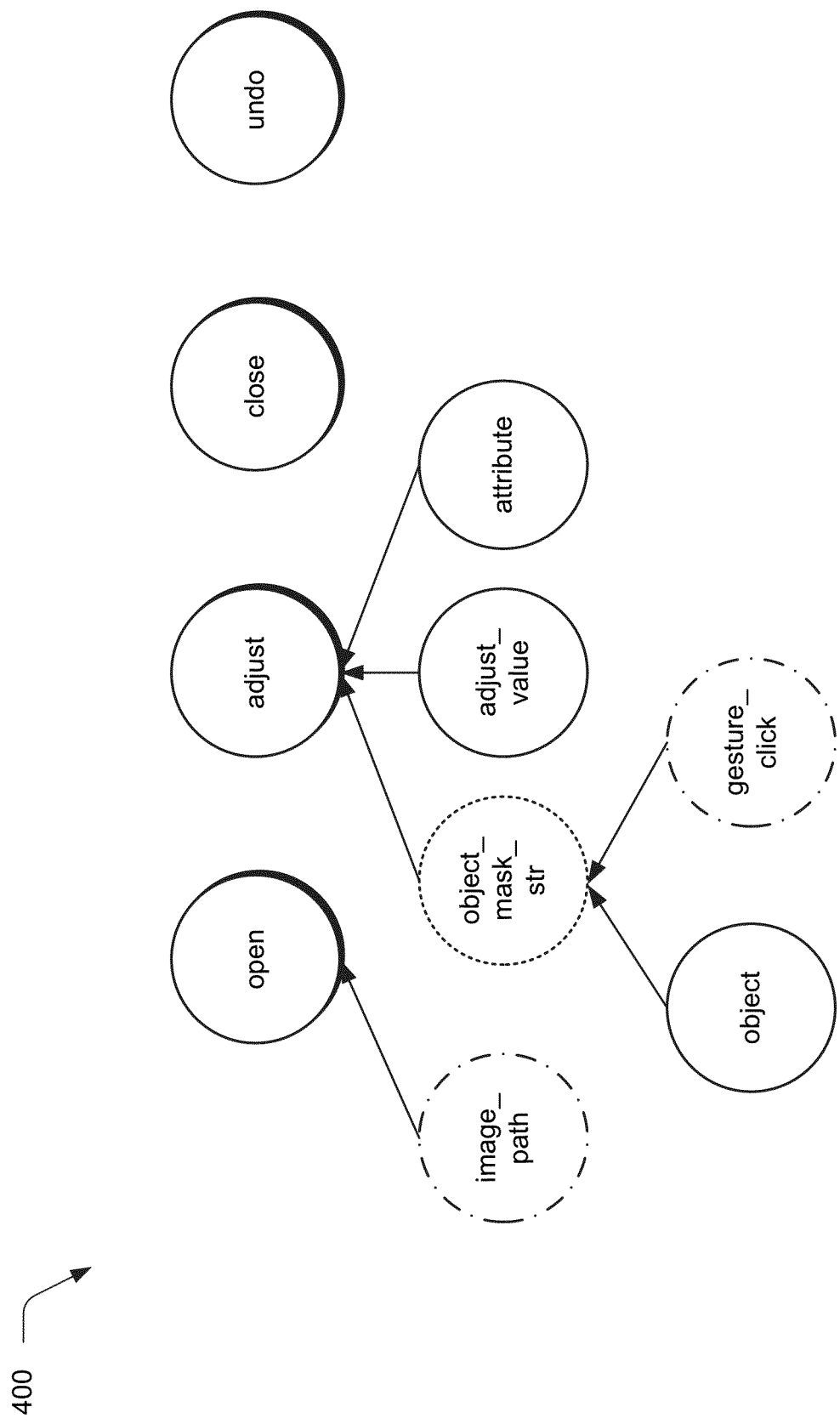
FIG. 4 depicts an example of a goal slot dependency hierarchy.
Figure 5:
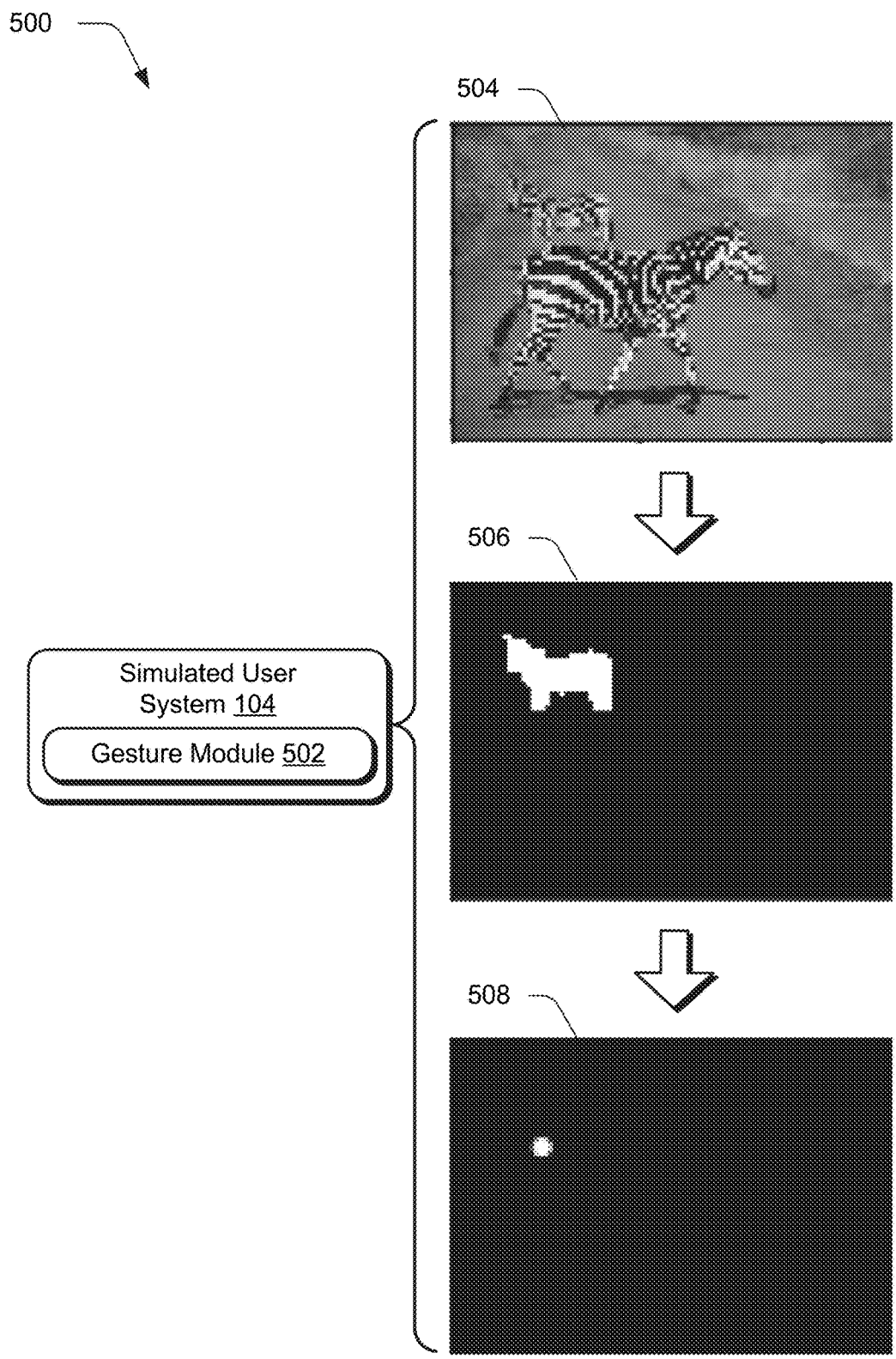
FIG. 5 depicts an example implementation of simulation of a user action that includes a gesture.
Figure 6:
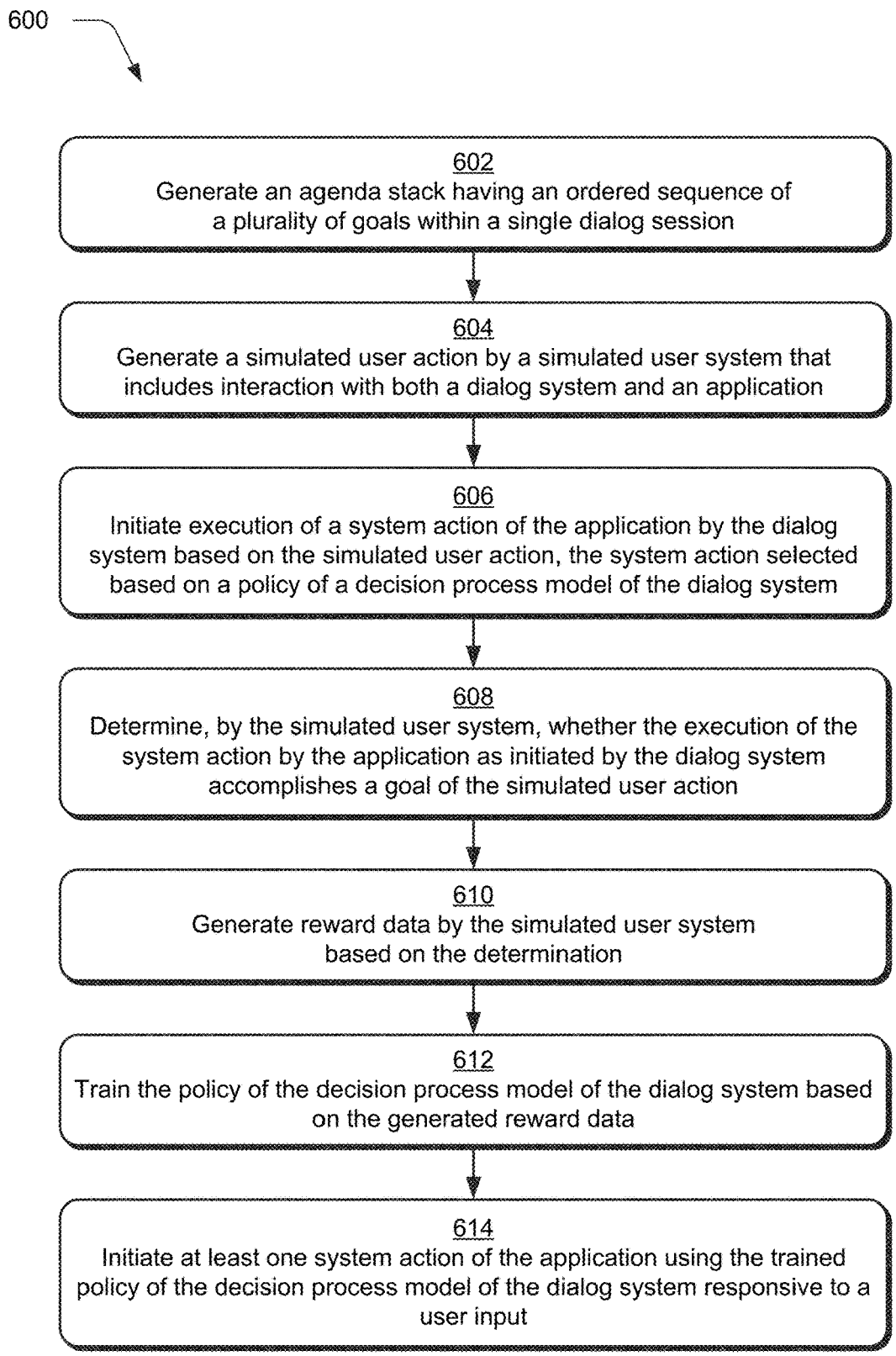
FIG. 6 is a flow diagram depicting a procedure in an example implementation in which generation of an agenda stack is used to then generate simulated user actions for both an application and a dialog system to train the dialog system using reward data.

FIG. 2 depicts a system 200 in an example implementation showing training of the dialog system 108 that employs the application 106 by the simulated user system 104 in greater detail. FIG. 3 depicts an example implementation 300 of the user model 130 of FIG. 2 in greater detail as generating the agenda stack 132. FIG. 4 depicts an example 400 of a goal slot dependency hierarchy used to generate the agenda stack 132. FIG. 5 depicts an example implementation 500 of simulation of a user action that includes a gesture. FIG. 6 depicts a procedure 600 in an example implementation in which an agenda stack is generated by a computing device and used to simulate user actions for both an application and a dialog system to train the dialog system using reward data.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

The user model 130 of the simulated user system 104 that is used to generate a simulated user action 202 employs an agenda-based approach. This is accomplished through use of an agenda stack 132. As shown in FIG. 3, the agenda stack 132 includes an ordered sequence of goals, examples of which include goal 302(1), ..., goal 302(n), ..., goal 302(N). The agenda stack 132 may also support multiple goals in parallel, and thus is not limited to a single sequence. In the illustrated example, the top goal (e.g., goal 302(1)) is a current goal of a simulated user action 202 generated by the simulated user system 104. Once completed, the goal 302(1) is removed from the agenda stack 132 and the system proceeds with simulating the next goal. Additional goals may be added into the agenda stack 132 during runtime, e.g., during execution of a dialog session modeled by the agenda stack 132 to undo or redo simulated user actions.

Thus, each of the goals 302(1)-302(N) correspond to a respective dialog, within a dialog session, between the simulated user system 104 and the dialog system 108, which may also include interaction with the application 106. Upon completion of each of the goals 302(1)-302(N), the agenda stack 132 is considered completed by the simulated user system 104 and results in a successful dialog session. If the agenda stack 132 is not completed within a predefined number of simulated user actions (e.g., turns $T_{max}$), the dialog session is considered as failed by the simulated user system 104.

In an implementation, the agenda stack 132 is generated, automatically and without user intervention, by the simulated user system 104 as having an ordered sequence of a plurality of goals 302(1)-302(N) within a single dialog session (block 602) by a goal generation module 306. To do so, the goal generation module 304 generates the agenda stack based on a plurality of predefined goals. Examples of predefined goals include open, adjust, close, undo, and redo. Goals may include slots, which refer to digital content or attributes that are a subject of the goal.

An open goal, for instance, may include a slot that refers to a particular item of digital content 110, e.g., "Goal=open, image_path=dog.jpg" 306(1). An adjust goal includes a slot that references an attribute that defines an amount, to which, an adjustment to the attribute is to be applied, e.g., "adjust_value." The adjust goal may also include a multimodal input, such as a gesture through use of an "object_mask_str," "object," and "gesture_click" as described in greater detail below in relation to FIG. 5. An example of an adjust goal is illustrated in FIG. 3 as "Goal=adjust, attribute=brightness, object=image, adjust_value 30" 306(n). Close, undo, and redo goals do not include dependency slots, an example of which is illustrated as "Goal=close" 306(N).

Typically, the agenda stack 132, as generated by the goal generation module 304, starts with an open goal, is followed by one or more adjust goals, and ends with a close goal. Undo and redo goals may be added to the agenda stack 132 by the goal generation module 304 during runtime (e.g., execution of the dialog session) to respond to success or lack of success of system actions of the application 106 as initiated by the dialog system 108. Goals may be generated by the goal generation module 304 according to a schema or sampled from real human adjustments. An example of a schema is included below:

| Schema | Values |
|---|---|
| Dialog Acts | Inform, Affirm, Negate, Wait, Bye |
| Goals (Intents) | Open, Adjust, Close, Undo, Redo |
| Slots | Image_path, object_mask_str, attribute adjust_value, object, gesture_click |

FIG. 4 depicts an example 400 of an goal slot dependency hierarchy usable to generate the agenda stack 132 by the goal generation module 304. Nodes that are shadowed denote goals (e.g., intents), and other nodes denote slots. The arrows indicate heuristically defined hierarchies.

The agenda stack 132, once generated, is then used by the simulated user system to generate a simulated user action 202, which may include interaction with both the dialog system 108 and the application 106 (block 604). The simulated user action 202, for instance, may include a dialog, which may be input via as text to mimic a speech-to-text input, and an input that mimics user interaction with the user interface 114, e.g., as a gesture. Other examples of single modal simulated user actions are also contemplated for inclusion within the agenda stack 132.

An example 500 of generation of a simulated user action 202 that includes a gesture by a gesture module 502 of the simulated user system 104 is depicted in FIG. 5. The gesture module 502, for instance, may obtain an input digital image 504 and a segmentation mask 506. A simulated user action that includes a "gesture_click" is simulated by the gesture module 502 by determining a centroid of the segmentation mask 506 for the object, i.e., "object_mask_str," to simulate user selection of the top-left zebra in the illustrated example, e.g., via a "tap" at the centroid. In this way, the simulated user system 104 supports multiagent and multimodal simulation of user actions that support multiple goals within a single dialog session to train the dialog system 108.

The dialog system 108 is tasked with determining a likely goal (e.g., intent) of a simulated user action 202 as specified via a natural language input as part of a dialog. One technique used to do so by the dialog system 108 relies on a partially observable Markov decision process (POMDP). This process employs a state update module 204 that is used to update a state 206, which is leveraged by a policy 128 of the policy module 208 to initiate a system action 210 based on a likely goal of the simulated user action 202 as determined by the policy.

POMDP is a generalization of a Markov decision process. A Markov decision process (MDP) involves discrete time stochastic control using an underlying mathematical framework to model decision making in situations where the outcome is partly random and partially under the control of a decision maker. POMDP techniques model decisions of a decision maker in which an assumption is made that system dynamics follow a Markov decision process, but that the underlying state is not directly observable. Because of this, POMDP maintains a probability distribution of a set of possible states, based on a set of observations and observation probabilities, and the underlying MDP to determine which of the system actions 116 is a likely goal of the simulated user action 202. The dialog system 108 also employs a vision engine 212 that is configured to perform object recognition to locate objects that are a subject of the simulated user action 202 as further described below. As such, the simulated user system 104 is configured to train the policy 128 of the dialog system 108 to increase accuracy of probabilities used to initiate system actions 210 based on simulated user actions 202.

Execution of a system action 116 by the application 106 is initiated by the dialog system 108 based on the simulated user action 202. The initiated system action 210 is selected based on a policy 128 of a decision process model 126 of the dialog system 108 (block 606), e.g., by probabilities using a POMDP technique. In the illustrated example, the initiated system action 210 is input to both the simulated user system 104 and the application 106 and thus the simulated user system 104 is made aware of the system action initiated by the dialog system 108. The initiated system action 210 causes the application 106 to generate an executed system action 214, which is then provided as an input from the application 106 to the simulated user system 104.

A determination is then made, by the simulated user system 104, as to whether the executed system action 214 by the application 106 as initiated by the dialog system 108 accomplishes a goal of the simulated user action 202 (block 608), e.g., a corresponding goal from the agenda stack 132. Based on this, reward data 216 is generated by a reward model 218 of the simulated user system 104 (block 610), which is communicated back to the dialog system 108 to train the policy 128 of the decision process model 126.

The reward data 216 may be defined with respect to the agenda stack 132 in a variety of ways, both singly with respect to individual goals of the agenda stack 132 (e.g., whether a goal of a respective dialog within a dialog session is accomplished) and collectively with respect to the agenda stack as a whole, e.g., whether the dialog session as a whole is accomplished. Once trained, the policy 128 of the decision process model of the dialog system may then be used to initiate a system action 116 of the application 106 based on receipt of an "actual" or "real" user action (block 614). As a result, accuracy in training the policy 128 is increased with respect to conventional training techniques.

In an implementation, the simulated user system 104 supports four types of simulated user actions: inform, confirm, wait, and bye. Inform user actions are configured to inform the dialog system 108 of the slot values in a current goal of the agenda stack 132. Affirm and negate actions are used by the simulated user system 104 to confirm whether a provided slot value from the dialog system 108 is correct. A wait action is a response by the simulated user system 104 to a dialog system's 108 query action, during which the simulated user system 104 does not simulate another user action for a defined amount of time. A bye action occurs when the dialog session is completed. When the dialog system 108 requests/confirms a slot value not associated with a current goal from the agenda stack 132, the simulated user system 104 falls back to a default action, which is to inform the dialog system 108 of a current goal.

When the dialog system 108 initiates a system action 210, the simulated user system 104 first checks as to whether the application 108 actually executed the action, e.g., generated the executed system action 214. If not (e.g., insufficient arguments, undo without history, etc.) meaning that no system action 116 was executed by the application 106, the simulated user system 104 falls back to a default user action and informs the dialog system 108 of a current goal by again generating the simulated user action 202. If the executed system action 214 occurred, the simulated user system 104 determines whether execution information provided by the application 106 matches a current goal of the agenda stack 132, e.g., whether slot values of the executed system action 214 match slot values of the simulated user action 202 from the agenda stack 132.

The simulated user system 104 may also employ soft constraints for slot values to determine whether a corresponding goal is achieved. For "object_mask_str," for instance, a threshold "d" may be specified for a dice coefficient between the dialog system's 108 object mask and the simulated user system's 104 object mask. For "adjust_value," a threshold v is set so that a range of values may be considered as a success and therefore accomplishing the goal.

If the executed system action 214 achieves a current goal of the simulated user action 202 from the agenda stack 132, that goal is removed from the stack and the user model 130 proceeds to the next goal, if included in the stack. Customized simulated user actions may be employed by the user model 130 when the goal is not achieved. When the dialog system 108 wrongly executes an "undo" system action, for instance, the simulated user system 104 may generate a simulated user action 202 of a "redo" goal that is added to the agenda stack 132 by the user model 130. In an instance in which a current goal is "adjust," but the adjust_value differs from a goal within a threshold amount, the simulated user system 104 may generated a simulated user action 202 of "a little bit more" in a dialog that is conditioned on the previous execution. Other examples are also contemplated.

The simulated user system 104 also includes an error model 220. The error model is configured to introduce error to the simulated user action 202 to simulate real world conditions of a human user, e.g., speech recognition errors. An input to the error model 220 from the user model 130 is in the form of a list of tuples [(s1, v1), (s2, v2), . . . ] where "s" denotes the slots and "v" denotes the corresponding slot value. The output of the error model is in the form of [(s1, v1, c1), (s2, v2, c2), . . . ] where an additional confidence score "c" is assigned to each slot/value pair.

The confidence score indicates an amount of confidence that the slot value is correct. For natural language input slots, a probability parameter p is configured and assigned to the slot values as the confidence score. The values of the slots, for instance, may be randomly assigned by the error model 220 according to this probability parameter. A value of "1−p" is the error rate. For other types of simulated user actions using other input modes such as gestures that involve direct interaction of the simulated user system 104 with the application 108, these actions may be considered as not containing errors due to this direct interaction and therefore slot values are assigned a confidence score "c" of 1.0 without modifying the values of the slot.

As previously described, the reward data 216 generated by the reward model 218 of the simulated user system 104 is used to train the policy 128 (e.g., set probability distributions) of the dialog system 108. Through use of the agenda stack 132, two types of rewards may be employed to generate the reward data 216, which is not possible using conventional techniques.

The first type of reward is configured to encourage completion of a respective dialog as soon as possible, and rewards successful dialogs in achieving a goal and penalized dialogs that fail. A turn reward penalty of "−1" is assigned at each dialog within a dialog session and a large positive reward "$C_{success}$" is assigned at the end of successful dialog session. Success in defined as to whether the goals of agenda stack 132 for the dialog session is achieved within a predefined number of turns "$T_{max}$." Therefore, successful dialog sessions receive a return (sum of rewards) of "$-k+C_{success}$," where "k<T" is a number of turns taken to complete the goals, and a dialog session that fails receives of return of "$-T_{max}$."

The second type of reward reshapes the sparse rewards of the first type of reward above. While the first type of reward is sufficient to lead to successful training of the policy 128, a dialog session that involves interaction with the application 106, especially in digital image editing scenarios, may involve a long sequence of goals within the agenda stack 132. Therefore, a positive reward awarded at the end of a successful dialog session may be difficult to guide training of the policy 128 in such a scenario. Accordingly, the second type of reward may be used in which a turn penalty "−1" remains the same. A positive reward "C+" is generated when a goal in the agenda stack 132 is completed, and a negative reward "C−" is generated by the reward model 218 when an incorrect system action is executed, which may cause the simulated user system 104 to add an "undo" goal to the agenda stack 132. A negative reward may also be generated by the reward model 218 in response to user provision of "object_mask_str" as part of a gesture.

As a result, the simulated user system 194 overcomes a variety of challenges of conventional training techniques, thereby increasing accuracy and efficiency of computational resource consumption and user interaction. The techniques described herein, for instance, support multimodal, multi-agent, and multigoal simulation of user actions and as support increased richness of simulating user actions with a wider range of agents (e.g., applications) that is not possible using conventional techniques.

Example System and Device

Figure 7:
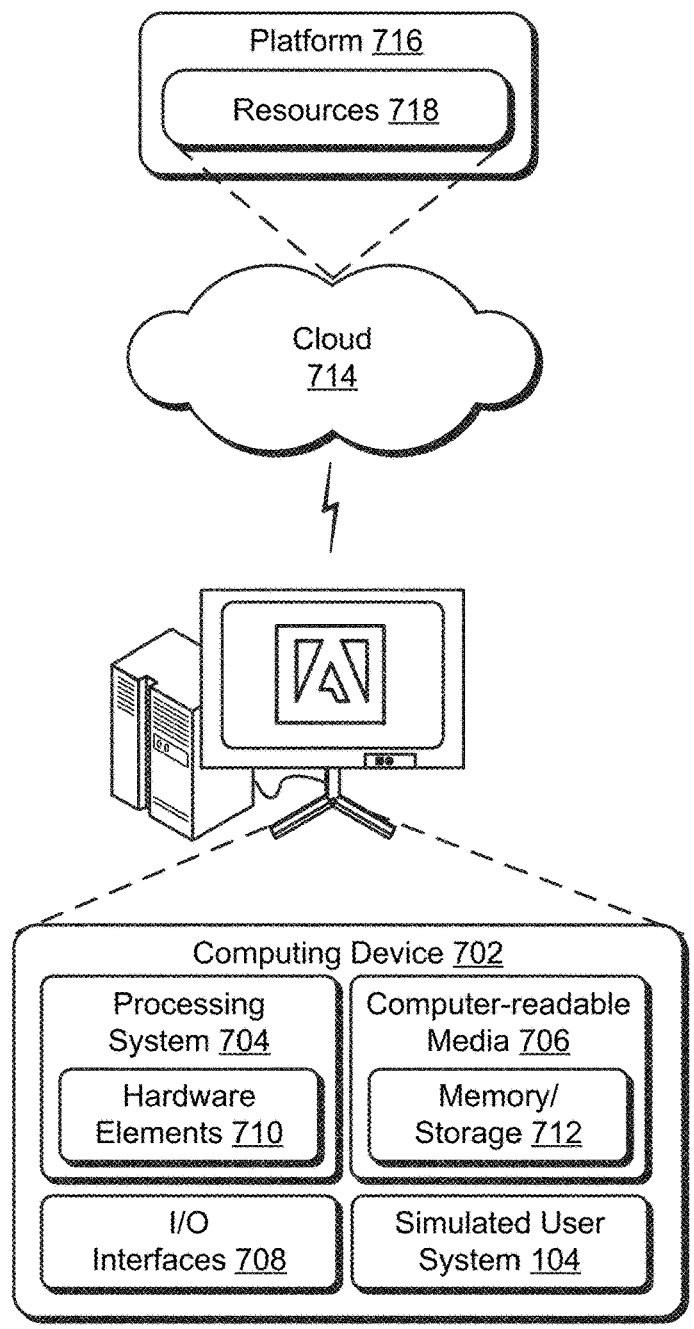
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the simulated user system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device of a simulated user system, the method comprising:
   generating, by the simulated user system of the computing device, a simulated user action that includes interaction with both a dialog system and an application, the simulated user interaction specifying an adjustment to an attribute of an object included in a digital image by a defined value and includes error based on an error model;
   initiating, by computing device, execution of a system action of the application by the dialog system based on the simulated user action, the system action selected based on a policy of a decision process model of the dialog system;

determining, by the simulated user system of the computing device, whether the execution of the system action by the application as initiated by dialog system accomplishes a goal of the simulated user action in adjusting the attribute of the object in the digital image by the defined value;

generating, by the simulated user system of the computing device, reward data based on the determining; and training, by the computing device, the policy of the decision process model of the dialog system based on the generated reward data.

2. The method as described in claim 1, wherein the simulated user action is based on the goal as taken from of a plurality of goals of an agenda stack.

3. The method as described in claim 2, wherein the agenda stack starts with an open goal, includes at least one adjust goal, and ends with a close goal.

4. The method as described in claim 2, further comprising generating, by the simulated user system of the computing device, the agenda stack as having an ordered sequence of the plurality of goals within a single dialog session.

5. The method as described in claim 4, wherein the plurality of goals is generated using open, adjust, close, undo, or redo goals.

6. The method as described in claim 5, wherein:

the open goal includes a slot specifying data that is to be processed by the application; and the adjust goal includes a slot specifying an attribute and a slot specifying an attribute value for the attribute.

7. The method as described in claim 6, wherein the adjust goal further includes an object is specified using an object mask and a gesture that is part of interaction with the application, the gesture based on the object mask.

8. The method as described in claim 1, wherein the reward data includes a reward based on whether the goal of the simulated user action of a single dialog of a plurality of dialogs within a dialog session is accomplished.

9. The method as described in claim 1, wherein the reward data includes a collective reward based on whether goals of a plurality of said simulated user actions of a single dialog session are accomplished.

10. The method as described in claim 1, wherein the generating the simulated user action by the simulated user system includes error based on the error model, an input to the error model is in a form of a list of tuples defining slots and slot values and an output is an additional confidence score.

11. A system comprising:

an application stored in a computer-readable storage medium and executable by a processing system to implement a plurality of system actions;

a dialog system stored in the computer-readable storage medium and executable by the processing system to initiate the plurality of system actions of the application based on a policy of a decision process model; and a simulated user system stored in the computer-readable storage medium and executable by the processing system to:

generate an agenda stack having an ordered sequence of a plurality of goals by selecting from a plurality of predefined goals and setting values for respective said goals;

execute simulated user actions, as part of a dialog session, that cause the dialog system to initiate respective said system actions of the application, the dialog session defined using the agenda stack;

determine whether the execution of the respective said system actions of the application accomplish respective said goals of the simulated user actions;

generate reward data based on the determination; and train the policy of the decision process model of the dialog system based on the generated reward data.

12. The system as described in claim 11, wherein the reward data includes a reward based on whether the respective said goal for a single dialog of the dialog session is accomplished.

13. The system as described in claim 11, wherein the reward data includes a reward based on whether the respective said goals, collectively, for the dialog session are accomplished.

14. The system as described in claim 11, wherein the simulated user system includes an error model that includes error as part of the simulated user action.

15. The system as described in claim 11, wherein the simulated user system further includes a goal generation module to generate the agenda stack, automatically and without user intervention, having the ordered sequence of the plurality of goals within a single dialog session.

16. The system as described in claim 15, wherein the plurality of goals is generated using open, adjust, close, undo, or redo goals.

17. The system as described in claim 16, wherein:

the open goal includes a slot specifying data that is to be processed by the application; and the adjust goal includes a slot specifying an attribute and a slot specifying an attribute value for the attribute.

18. The system as described in claim 17, wherein the adjust goal further includes an object is specified using an object mask and a gesture based on the object mask.

19. The system as describe in claim 11, wherein at least one said simulated user action includes interaction with both the application and the dialog system.

20. A system comprising:

means for executing a plurality of system actions;

means for initiating the plurality of system actions based on a policy of a decision process model as part of a dialog session; and means for simulating user actions, as part of the dialog session, that:

cause the initiating means to initiate execution of respective said system actions, the dialog session defined using an agenda stack having a plurality of goals and the simulated user actions including interaction with both the initiating means and the executing means, the agenda stack having an ordered sequence of the plurality of goals within a single dialog session, the plurality of goals generated using:

an open goal including a slot specifying data that is to be processed;

an adjust goal including a slot specifying an attribute, a slot specifying an attribute value for the attribute, and an object specified using an object mask and a gesture based on the object mask;

a close goal;

an undo goal; or a redo goal;

determine whether the execution of the respective said system actions accomplish respective said goals of the simulated user actions;
generate reward data based on the determination; and
train the policy of the decision process model based on the generated reward data.

* * * * *